(12) United States Patent
Shin et al.

(10) Patent No.: US 10,129,708 B2
(45) Date of Patent: Nov. 13, 2018

(54) SERVICE SYSTEM FOR PROVIDING INDOOR LOCATION INFORMATION USING CARD VIEW AND METHOD THEREFOR

(71) Applicants: LINE Corporation, Tokyo (JP); NAVER CORPORATION, Seongnam-si, Gyeonggi-do (KR)

(72) Inventors: Jieun Shin, Seongnam-si (KR); Seungjun Lee, Seongnam-si (KR); Hyojin Kwon, Seongnam-si (KR)

(73) Assignees: LINE CORPORATION, Tokyo (JP); NAVER CORPORATION, Gyeonggi-Do (KR)

( * ) Notice: Subject to any disclaimer, the term of this patent is extended or adjusted under 35 U.S.C. 154(b) by 497 days.

(21) Appl. No.: 14/838,281

(22) Filed: Aug. 27, 2015

(65) Prior Publication Data
US 2016/0269869 A1    Sep. 15, 2016

(30) Foreign Application Priority Data

Mar. 12, 2015    (KR) .................. 10-2015-0034377

(51) Int. Cl.
*H04W 4/029*    (2018.01)
*H04W 4/04*    (2009.01)

(52) U.S. Cl.
CPC .......... *H04W 4/043* (2013.01); *H04W 4/029* (2018.02)

(58) Field of Classification Search
CPC .... H04W 4/043; H04W 4/028; H04W 4/0289
See application file for complete search history.

(56) References Cited

U.S. PATENT DOCUMENTS

2006/0019679 A1*    1/2006    Rappaport ............ G01S 5/0252
                                                            455/456.5
2007/0078596 A1    4/2007    Grace
(Continued)

FOREIGN PATENT DOCUMENTS

JP    2001-235345 A    8/2001
JP    2004213084 A    7/2004
(Continued)

OTHER PUBLICATIONS

Office Action for Corresponding Japanese Patent Application No. 2015-095854 dated Mar. 29, 2016.
(Continued)

*Primary Examiner* — Joseph Dean, Jr.
(74) *Attorney, Agent, or Firm* — Harness, Dickey & Pierce, P.L.C.

(57) ABSTRACT

A service method in a service system implemented with a computer includes generating, by one or more processors, movement path information from a source location to a destination location in a target building including a plurality of floors; configuring a card view including the movement path information according to each floor from among the plurality of floors; and providing a card view of an occupied floor to the user terminal based on a location of the user terminal, the occupied floor being a floor, from among the plurality of floors, where a user terminal is located, wherein the movement path information is generated based on information about one or more inter-floor moving devices included on paths which extend from the source location to the destination, and wherein the card view includes information about one or more inter-floor moving devices of the occupied floor.

13 Claims, 12 Drawing Sheets

(56) References Cited

U.S. PATENT DOCUMENTS

| | | | |
|---|---|---|---|
| 2011/0045846 A1* | 2/2011 | Rekimoto | G01S 5/0018 455/456.1 |
| 2012/0029816 A1 | 2/2012 | Kato et al. | |
| 2015/0049959 A1* | 2/2015 | Johnson | G06F 17/30268 382/305 |

FOREIGN PATENT DOCUMENTS

| | | |
|---|---|---|
| JP | 2006-039887 A | 2/2006 |
| JP | 2007-199592 A | 8/2007 |
| JP | 2008-304333 A | 12/2008 |
| JP | 2009-510455 A | 3/2009 |
| JP | 2009222579 A | 10/2009 |
| JP | 2011-122954 A | 6/2011 |
| JP | 2011145164 A | 7/2011 |
| JP | 2013-033122 A | 2/2013 |
| JP | 2014-163907 A | 9/2014 |
| JP | 2014160032 A | 9/2014 |
| JP | 2015-017922 A | 1/2015 |
| KR | 20030027731 A | 4/2003 |
| KR | 2014-0146879 A | 12/2014 |
| WO | WO-2007-041547 A1 | 4/2007 |

OTHER PUBLICATIONS

Office Action for Corresponding Korean Patent Application No. 10-2015-0034377 dated Jul. 8, 2016.

Office Action for corresponding Japanese Patent Application No. 2015-095854 dated Nov. 29, 2016 and English translation thereof.

Office Action for Corresponding Korean Patent Application No. 10-2015-0034377 dated Jan. 22, 2016.

Office Action for corresponding Japanese Patent Application No. 2015-095854 dated Jun. 27, 2017 and Partial English translation thereof.

Report of Reconsideration by Examiner before Appeal for corresponding Japanese application No. 2015-095854 dated Dec. 25, 2017 with Partial English translation.

\* cited by examiner

SERVICE SYSTEM FOR PROVIDING INDOOR LOCATION INFORMATION USING CARD VIEW AND METHOD THEREFOR

CROSS-REFERENCE TO RELATED APPLICATIONS

A claim for priority under 35 U.S.C. § 119 is made to Korean Patent Application No. 10-2015-0034377 filed Mar. 12, 2015, in the Korean Intellectual Property Office, the entire contents of which are hereby incorporated by reference.

BACKGROUND

At least some example embodiments of the inventive concepts described herein relate to technologies for providing indoor location information using a card view, and more particularly, to a service system for providing information for inter-floor movement in providing indoor location information and a method therefor.

Recently, with the spread of a large number of smartphones and the development of mobile communication networks, users may freely receive a variety of information and services without restrictions in time and space.

A location based service among the services the users receive provides information suitable for various purposes to the users by being applied to notification of a bus/subway arrival time, navigation, and the like. To provide the location based service to a user, there is a need for a process of obtaining accurate location information of the user or an object. This location information is generally obtained according to a global positioning system (GPS) signal. However, when the location information is obtained according to the GPS signal, it is difficult to measure a location of a real user or object in a shadow area of the GPS signal, such as an area between buildings, or an area, such as the inside of a building, which is difficult to receive the GPS signal.

Therefore, with respect to at least one conventional method of providing the location based service in the area, such as the inside of the building, where it is difficult to receive the GPS signal, an apparatus collects scan information about indoor access points APs and maps scan information about monitoring APs to an indoor map using reference or, alternatively, predetermined location information of at least one or more monitoring APs. The apparatus generates location information on the indoor map with respect to one or more virtual APs using scan information about the at least one or more virtual APs through the scan information. The apparatus generates identification information about each of cells which are preset in the indoor map and include the monitoring APs and the virtual APs and collects reference point information for indoor wireless measurement, thus measuring an indoor location.

However, this conventional apparatus may cause a distance error that is higher than desired and a response speed that is lower than desired in measurement. Because of the location is a virtually computed location rather than actual collected data, the apparatus may have lower than desired reliability.

Therefore, it may be desirable to provide a method for measuring a current location of a user more accurately and quickly than a conventional measurement method in an area, such as the inside of the building, where it is difficult to receive GPS signals.

SUMMARY

At least some example embodiments of the inventive concepts provide a service system for providing indoor location information including information about inter-floor moving means or device such as stairs, elevators, and escalators and a method therefor.

At least some example embodiments of the inventive concepts provide a service system for providing an improved or, alternatively, optimum movement path indoors by determining a more proper inter-floor moving means or device in consideration of a movement time and a method therefor.

According to at least one example embodiment of the inventive concepts, a service method in a service system implemented with a computer includes generating, by one or more processors, movement path information from a source location to a destination location in a target building including a plurality of floors; configuring a card view including the movement path information according to each floor from among the plurality of floors; and providing a card view of an occupied floor to the user terminal based on a location of the user terminal, the occupied floor being a floor, from among the plurality of floors, where a user terminal is located, wherein the movement path information is generated based on information about one or more inter-floor moving devices included on paths which extend from the source location to the destination, and wherein the card view includes information about one or more inter-floor moving devices of the occupied floor.

The method may further include providing a new card view of a new floor to the user terminal irrespective of a request from the user terminal, when the occupied floor changes to the new floor.

The generating the movement path information may include providing the information about the one or more inter-floor moving devices to the user terminal; and generating the movement path information to include an inter-floor moving device selected by the user terminal among the one or more inter-floor moving devices.

The generating the movement path information may include determining a movement time for each movement path via each of the one or more inter-floor moving devices; and generating the movement path information based on the determined movement time.

The method may further include receiving information about peripheral wireless access points (APs) around the user terminal from the user terminal; and determining an indoor location of the user terminal based on a similarity between fingerprint information and information about each of the peripheral wireless APs around the user terminal, the fingerprint information including information about each of a plurality of peripheral wireless APs that is collected for each of a plurality of points of the target building.

The movement path information may be generated based on the indoor location of the user terminal.

The method may further include providing the movement path information to the user terminal; correcting the movement path information based on the indoor location of the user terminal; and providing the corrected movement path information to the user terminal.

The method may further include collecting the fingerprint information at equal intervals in the target building, wherein the fingerprint information includes, for each of the plurality of points in the target building, a media access control (MAC) address and signal strength of each of the plurality of peripheral wireless APs that are located around the point, and wherein the determining of the indoor location of the user terminal includes, determining a similarity between signal strengths of each of the plurality of peripheral wireless APs corresponding to each of the plurality of points in the target building and signal strengths of each of the wireless APs around the user terminal based on MAC addresses of the plurality of peripheral wireless APs and a MAC addresses of the wireless APs around the user terminal, and determining a point, from among the plurality of points in the target building, that corresponds to the highest similarity as the indoor location of the user terminal.

Each of the one or more inter-floor moving devices may include at least one of an elevator, an escalator, or stairs.

According to at least one example embodiment of the inventive concepts, a non-transitory computer-readable medium storing instructions that, when executed by a computer, cause the computer to perform operations including, generating movement path information from a source location to a destination location in a target building including a plurality of floors; configuring a card view including the movement path information according to each floor from among the plurality of floors; and providing a card view of an occupied floor to the user terminal based on a location of the user terminal, the occupied floor being a floor, from among the plurality of floors, where a user terminal is located, wherein the movement path information is generated based on information about one or more inter-floor moving devices included on paths which extend from the source location to the destination, and wherein the card view includes information about one or more inter-floor moving devices of the occupied floor.

According to at least one example embodiment of the inventive concepts, a service system implemented with a computer includes a memory having computer-readable instructions stored therein; and at least one processor configured to execute the computer-readable instructions to generate movement path information from a source location to a destination location in a target building including a plurality of floors such that the movement path information is generated based on information about one or more inter-floor moving devices included on paths that extend from the source location to the destination, configure a card view including the movement path information according to each floor from among the plurality of floors such that the card view includes information about one or more inter-floor moving devices of an occupied floor, the occupied floor being a floor, from among the plurality of floors, where a user terminal is located, and provide a card view of the occupied floor to the user terminal based on a location of the user terminal.

The at least one processor may be further configured to provide the information about the one or more inter-floor moving devices to the user terminal and generate the movement path information to include an inter-floor moving device selected by the user terminal among the one or more inter-floor moving devices.

The at least one processor may be further configured to determine a movement time for each movement path via each of the one or more inter-floor moving devices and generate the movement path information based on the determined movement time.

The at least one processor may be further configured to receive information about peripheral wireless access points (APs) around the user terminal from the user terminal; and determine an indoor location of the user terminal based on a similarity between fingerprint information and information about each of the peripheral wireless APs around the user terminal, the fingerprint information including information about each of a plurality of peripheral wireless APs that is collected for each of a plurality of points of the target building.

BRIEF DESCRIPTION OF THE FIGURES

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION

Figure 1:
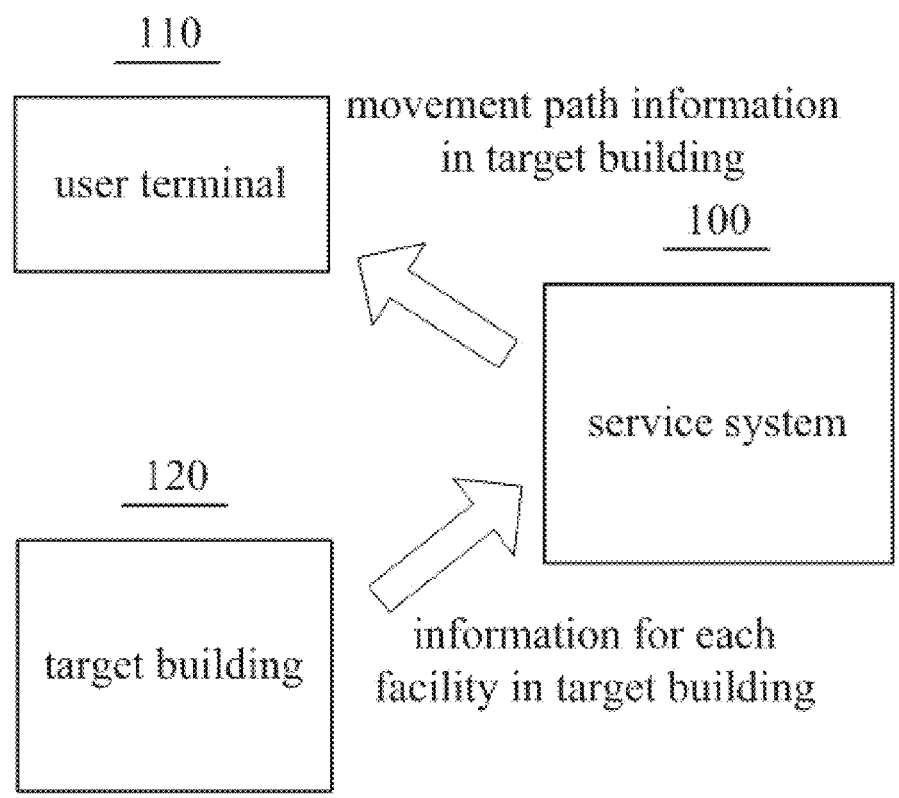
FIG. 1 is a drawing illustrating a service environment according to at least one example embodiment of the inventive concepts.

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments of the inventive concepts are described herein with reference to schematic illustrations of idealized embodiments (and intermediate structures) of the inventive concepts. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

Example embodiments disclosed herein may comprise program code including program instructions, software components, software modules, data files, data structures, and/or the like that are implemented by one or more physical hardware devices. Examples of program code include both machine code produced by a compiler and higher level program code that is executed using an interpreter. The hardware devices may include one or more processors. The one or more processors are computer processing devices configured to carry out the program code by performing arithmetical, logical, and input/output operations. Once the program code is loaded into the one or more processors, the one or more processors may be programmed to perform the program code, thereby transforming the one or more processors into special purpose processor(s).

Alternatively, or in addition to the processors discussed above, the hardware devices may include one or more Central Processing Units (CPUs), digital signal processors (DSPs), application-specific-integrated-circuits (ASICs), SoCs, field programmable gate arrays (FPGAs), or the like. In at least some cases, the one or more CPUs, SoCs, DSPs, ASICs and FPGAs, may generally be referred to as processing circuits and/or microprocessors.

The hardware devices may also include one or more storage devices. The one or more storage devices may be tangible or non-transitory computer-readable storage media, such as random access memory (RAM), read only memory (ROM), a permanent mass storage device (such as a disk drive), and/or any other like data storage mechanism capable of storing and recording data. The one or more storage devices may be configured to store program code for one or more operating systems and/or the program code for implementing the example embodiments described herein. The program code may also be loaded from a separate computer readable storage medium into the one or more storage devices and/or the one or more processors using a drive mechanism. Such separate computer readable storage medium may include a USB flash drive, memory stick, Blu-ray/DVD/CD-ROM drive, memory card, and/or other like computer readable storage medium (not shown). The program code may be loaded into the one or more storage devices and/or the one or more processors from a remote data storage device via a network interface, rather than via a computer readable storage medium. Additionally, the program code may be loaded into the one or more storage devices and/or the one or more processors from a remote computing system that is configured to transfer and/or distribute the program code over a network. The remote computing system may transfer and/or distribute the program code via a wired interface, an air interface, and/or any other like tangible or intangible medium. The one or more processors, the one or more storage devices, and/or the program code may be specially designed and constructed for the purposes of the example embodiments, or they may be known devices that are altered and/or modified for the purposes of the example embodiments.

It will be apparent to those skilled in the art that various modifications and variations can be made to the example embodiments without departing from the spirit or scope of the inventive concepts described herein. Thus, it is intended that the example embodiments cover the modifications and variations of the example embodiments provided they come within the scope of the appended claims and their equivalents.

Hereinafter, a description will be given in detail for at least some example embodiments of the inventive concepts with reference to the accompanying drawings.

At least some example embodiments of the inventive concepts relate to a service system for providing movement path information in consideration of an inter-floor moving means or device (e.g., an inter-floor moving device) and a method therefor.

FIG. 1 is a drawing illustrating a service environment according to at least one example embodiment of the inventive concepts. FIG. 1 illustrates a service system 100, a user terminal 110, and a target building 120. According to at least one example embodiment of the inventive concepts, each of the service system 100 and user terminal 110 may include memory and one or more processors. Further, according to at least one example embodiment, operations and/or functions described herein as being performed by any of a location sharing apparatus or a user terminal may be performed by a processor executing program code. The program code may be stored in the memory of the service system 100 and/or user terminal 110, and may include computer-executable instructions corresponding to the operations and/or functions described herein as being performed by the service system 100 and/or user terminal 110.

The service system 100 may be a server device which collects information (e.g., information for each facility) about the target building 120 and provides a service associated with the target building 120 to the user terminal 110. In this case, the target building 120 may be a building associated with a service to be provided to the user 110 among a plurality of buildings which receive information associated with the service system 100. For one example, the target building 120 may be a building selected through the user terminal 110 or may be a building in which the user terminal 110 is located. For another example, the target building 120 may include a plurality of buildings connected to each other. For example, when a subway station connects with a department store, a building for the subway station and a building for the department store may be the target building 120.

The user terminal 110 may be a device of a service user, which may connect to the service system 100 through a wired network and/or a wireless network and may receive a service.

The service system 100 may collect and maintain information for each facility which is located in the target building 120. For example, the information for each facility may include information about companies (e.g., stores which are located in a department store or an outlet, and the like) or amenities (e.g., toilets, elevators, escalators, stairs, and the like), and the like which are located in the target building 120.

Also, the service system 100 may determine a source location and a destination location. For example, the source location and the destination location may be selected through the user terminal 110. The service system 100 may transmit map information in the target building 120 to the user terminal 110 and may determine locations selected according to the map information by the user terminal 110 as a source location and a destination location. The source location may be selectively determined as an indoor location of the user terminal 110.

Also, the service system 100 may generate information about a movement path from the source location to the destination location using information for each facility. The movement path information may be transmitted to the user terminal 110. The user terminal 110 may provide a movement path service to a user by displaying the movement path information together with the map information.

For example, the service system 100 may verify information about inter-floor moving means or device included on paths, which are movable from the source location to the destination location (i.e., paths that a user can travel along and that extend from the source location to the destination location), through information for each facility and may determine a movement path to be included in movement path information in consideration of the verified information about the inter-floor moving means or device. Herein, the inter-floor moving means or device may be, for example, means or devices, such as escalators, elevators, and stairs, which are used to move from one floor to other floors. In other words, the service system 100 may provide movement path information. When inter-floor movement occurs, the service system 100 may generate movement path information in consideration of inter-floor moving means or device.

FIGS. 2 to 5 are drawings illustrating a process of providing movement path information according to at least one example embodiment of the inventive concepts.

FIGS. 2 to 5 illustrate examples of screens 200, 300, 400, and 500 displayed on a user terminal 110 of FIG. 1 in providing movement path information.

Figure 2:
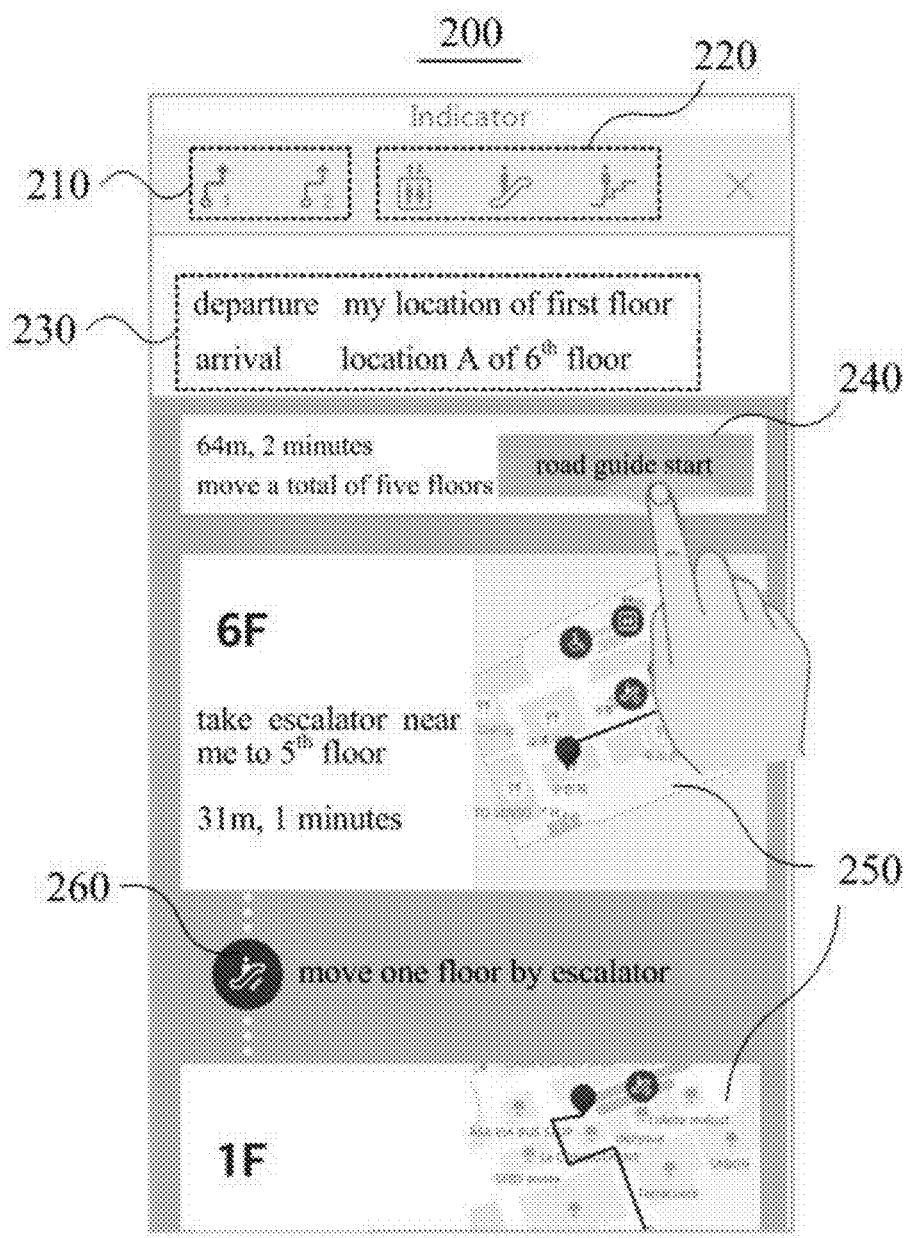
FIGS. 2 to 5 are drawings illustrating a process of providing movement path information according to at least one example embodiment of the inventive concepts.

The screen 200 of FIG. 2 is an example of a screen of the user terminal 110 and displays information about a movement path from a 'location in a first floor' which is a source location to a 'location A in a 6th floor' (e.g., a name of a specific company which is located in the 6th floor) which is a destination location.

A first dotted box 210 indicates left and right user interfaces for allowing a user to select one of provided first and second movement paths. The left user interface, on which the numeral '1' is written, which is included in the first dotted box 210 may be a user interface for selecting the first movement path provided by a service system 100 of FIG. 1. Also, the right user interface on which the numeral '2' is written may be a user interface for selecting the second movement path provided by the service system 100. The screen 200 displays an example in which the first movement path is selected. According to at least some example embodiments of the inventive concepts, selected movement paths and unselected movement paths may be displayed differently on the screen 200 (e.g., different colors, thicknesses, etc.).

A second dotted box 220 indicates user interfaces for allowing the user to select an inter-floor moving means or device. The user interfaces may include a user interface of an elevator shape, a user interface of an escalator shape, and a user interface of a stairs shape which are displayed from a left side to a right side of the screen 200. For example, when the user selects the user interface of the elevator shape in the second dotted box 220 (e.g., when the user taps a corresponding icon region with his or her finger), the service system 100 may provide a movement path using an elevator from a source location to a destination location to the user.

A third dotted box 230 indicates 'my location' of a first floor which as a source or 'departure' location and indicates a 'location A' of a 6th floor (e.g., a location identified by a name of a specific facility of a target building 120 of FIG. 1) as a destination or 'arrival' location. When the user selects a region displayed by the third dotted box 230, a screen (e.g., the screen 300 of FIG. 3) for resetting the source location and the destination location may be displayed on a user terminal 110 of FIG. 1.

A 'road guide start' user interface 240 may include a function for requesting to start a road guide service from a source location to a destination location. When the 'road guide start' user interface 240 is selected by the user, a service (e.g., the screen 400 of FIG. 4) of displaying information about a movement path from a source location to a destination location according to a location of the user terminal 110 may be provided to the user.

Also, the screen 200 may display a map 250 associated with a source location or a destination location and may further display information 260 about an inter-floor moving means or device which is present on a corresponding movement path.

Figure 3:
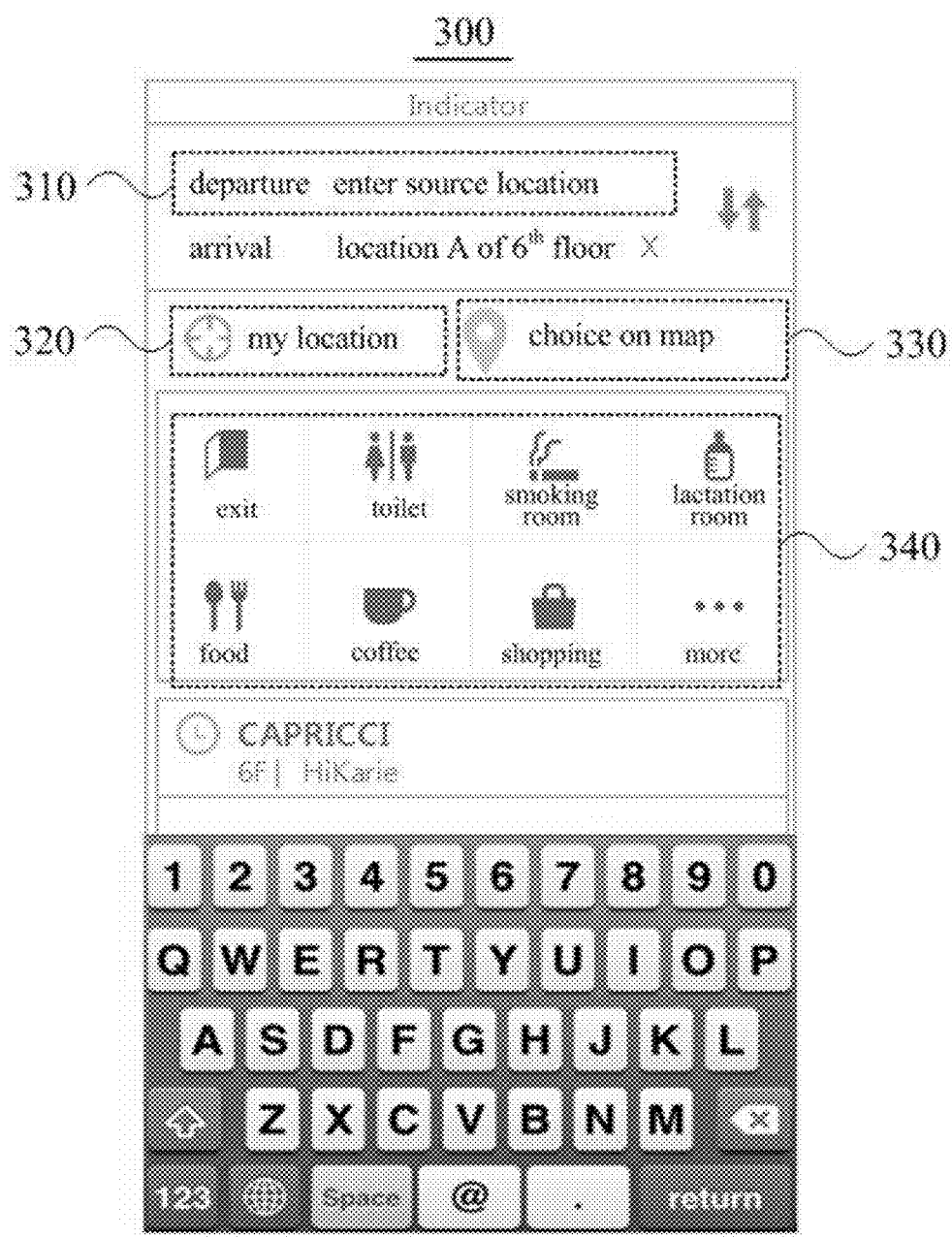

The screen 300 of FIG. 3 displays an example of setting a source location. A first dotted box 310 indicates that a user may directly enter information to be set to a source location. The entered information may be used for searching for a facility or point associated with a target building 120 of FIG. 1. For example, the entered information may be transmitted the service system 100. The service system 100 may search for information about a facility corresponding to the entered information by searching information for each facility located in the target building 120. For example, when information of the facility corresponding to the entered information includes a plurality of information, the service system 100 may provide information about a plurality of facilities to the user and may determine a source location using information about a facility selected by the user. A destination location may be also set in the same way.

A second dotted box 320 displays a user interface for setting a current location of the user terminal 110 to a source location. Also, a third dotted box 330 displays a user interface for allowing the user to directly select a source location on a map. When the user selects a region corresponding to the third dotted box 330, map information (e.g., map information, associated with a current location of the user terminal 110, as a default) may be provided to the user.

The 4th dotted box 340 displays a user interface for setting a specific type of a facility (e.g., an exit, a toilet, a smoking room, and a lactation room) to a source location or destination location. When the user selects a 'toilet' icon indicated in the 4th dotted box 340, information about the closest toilet to the user or a list of information about toilets included in the target building 120 may be provided to the user.

Figure 4:
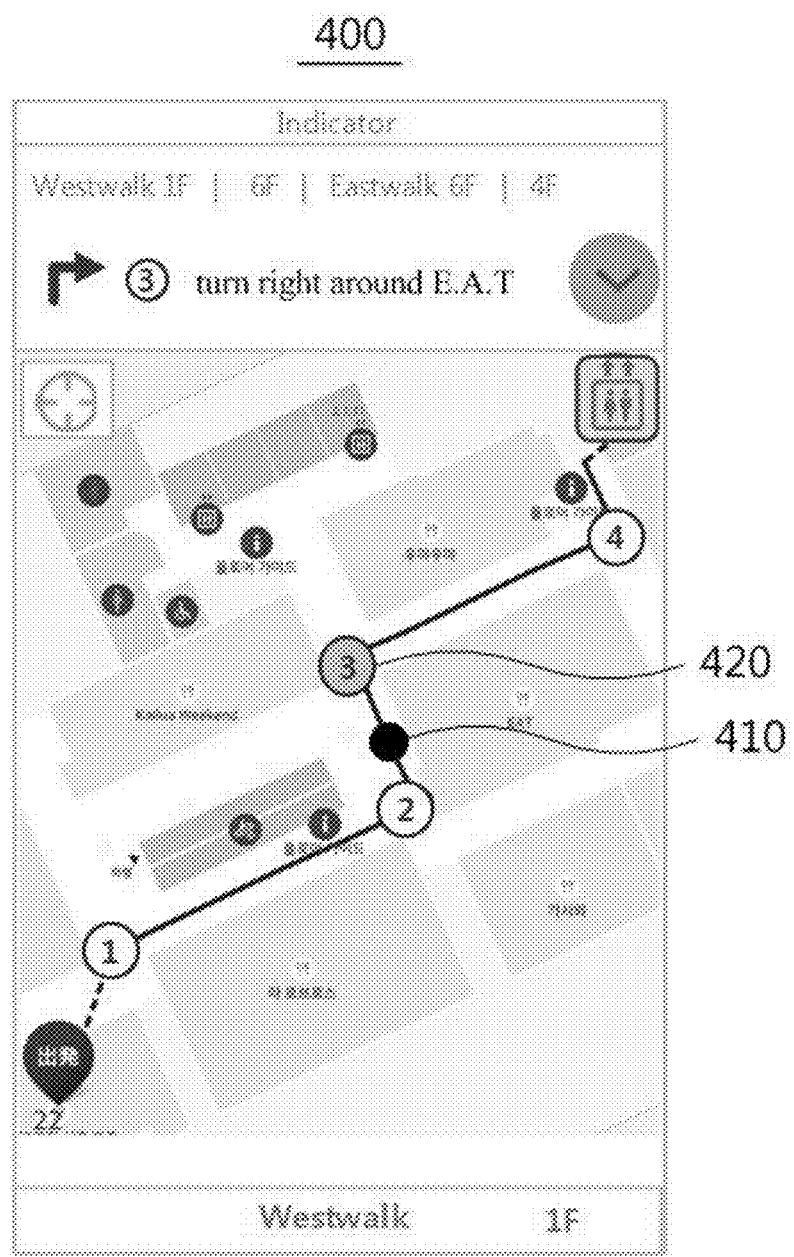

The screen 400 of FIG. 4 displays an example of a screen for providing a road guide service. In this case, movement path information may be displayed on a map and a road guide service may be provided according to a location 410 of the user terminal 110. For example, the screen 400 displays an indication of turning right at a location '3' 420 according to the location 410 of the user terminal 110. The screen 500 of FIG. 5 displays a list of guide information according to points included in movement path information of FIG. 4. In this case, a dotted box 510 indicates an example of including information about an inter-floor moving means or device.

Figure 5:
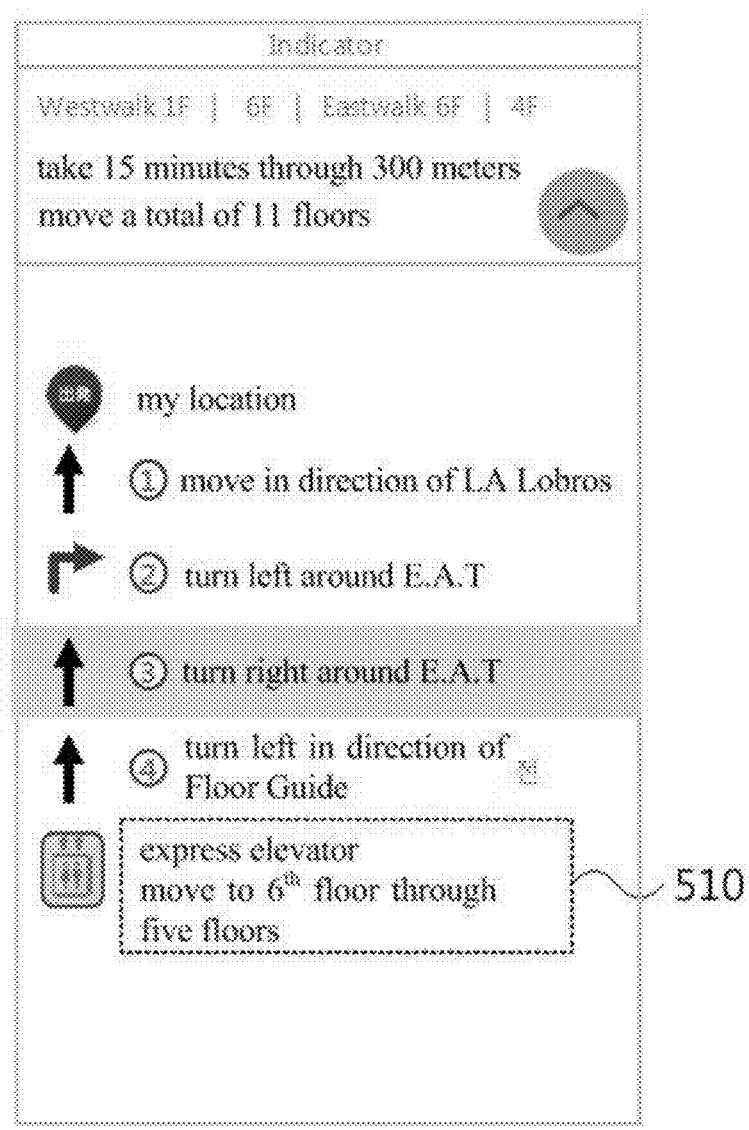

When the user moves to another floor through an inter-floor moving means or device, a card view for the other floor may be provided to the user terminal 110. In other words, the service system 100 may configure each movement path information for each floor as corresponding to one card view and may provide the configured card view to the user terminal 100. The user terminal 110 may display a card view of a corresponding floor on its screen according to a location of the user terminal 110. For example, as shown in FIG. 5, when the user takes an express elevator to the 6th floor, the service system 100 may provide a card view configured for the 6th floor to the user terminal 110. The card view configured for the 6th floor may be displayed on the screen of the user terminal 110. As a floor where the user terminal 110 is located is changed, the service system 100 may provide a new card view to the user terminal 110 irrespective of a request from the user terminal 110.

Also, the service system 100 may provide information about verified inter-floor moving means or devices to the user terminal 110. In this case, the service system 100 may determine a movement path to include an inter-floor moving means or device selected by the user terminal 110 among the verified inter-floor moving means or devices in movement path information. For example, the user selects a type of an inter-floor moving means or device on the screen 200 of FIG. 2. However, according to at least another example embodiment of the inventive concepts, the service system 100 may provide information (e.g., information about a position of each of elevators, escalators, and stairs and information about movement time from a current location) about inter-floor moving means or device included in the target building 120 to the user terminal 110 and may generate movement path information using information selected by the user among the provided information.

Also, the service system 110 may calculate a movement time for each movement path via a verified inter-floor moving means or device and may determine a movement path according to the calculated movement time. For example, the service system 100 may provide movement path information, including a movement path with the shortest movement time, to the user terminal 110.

For one example, an elevator may be classified as an express elevator or a normal elevator. A weight value in proportion to the number of moved floors may be applied to the elevator to calculate time required for inter-floor movement. For another example, a weight value may be applied to an escalator according to a distance between node coordinates of a current floor and a floor to move to calculate time required for inter-floor movement. Specifically, time required for inter-floor movement may be calculated through a weight value in proportion to a distance between a two-dimensional coordinate of a location where a user takes an escalator at a current floor and a two-dimensional coordinate of a location where the user gets off the escalator at an upper or lower floor. A weight value in proportion to the number of floors may be applied to stairs to calculate time required for inter-floor movement. The time required for inter-floor movement may be added to time required for intra-floor movement to calculate a movement time for each movement path.

Hereinafter, a description is given of a method for determining an indoor location of the user terminal 110.

The service system 100 may receive information about wireless access points (APs) around the user terminal 110 from the user terminal 110 which is located in the target building 120. Also, the service system 100 may determine an indoor location of the user terminal 110 according to similarity between information about each of peripheral wireless APs, which is collected for each point of the target building 120, and information about each of wireless APs around the user terminal 110.

Figure 6:
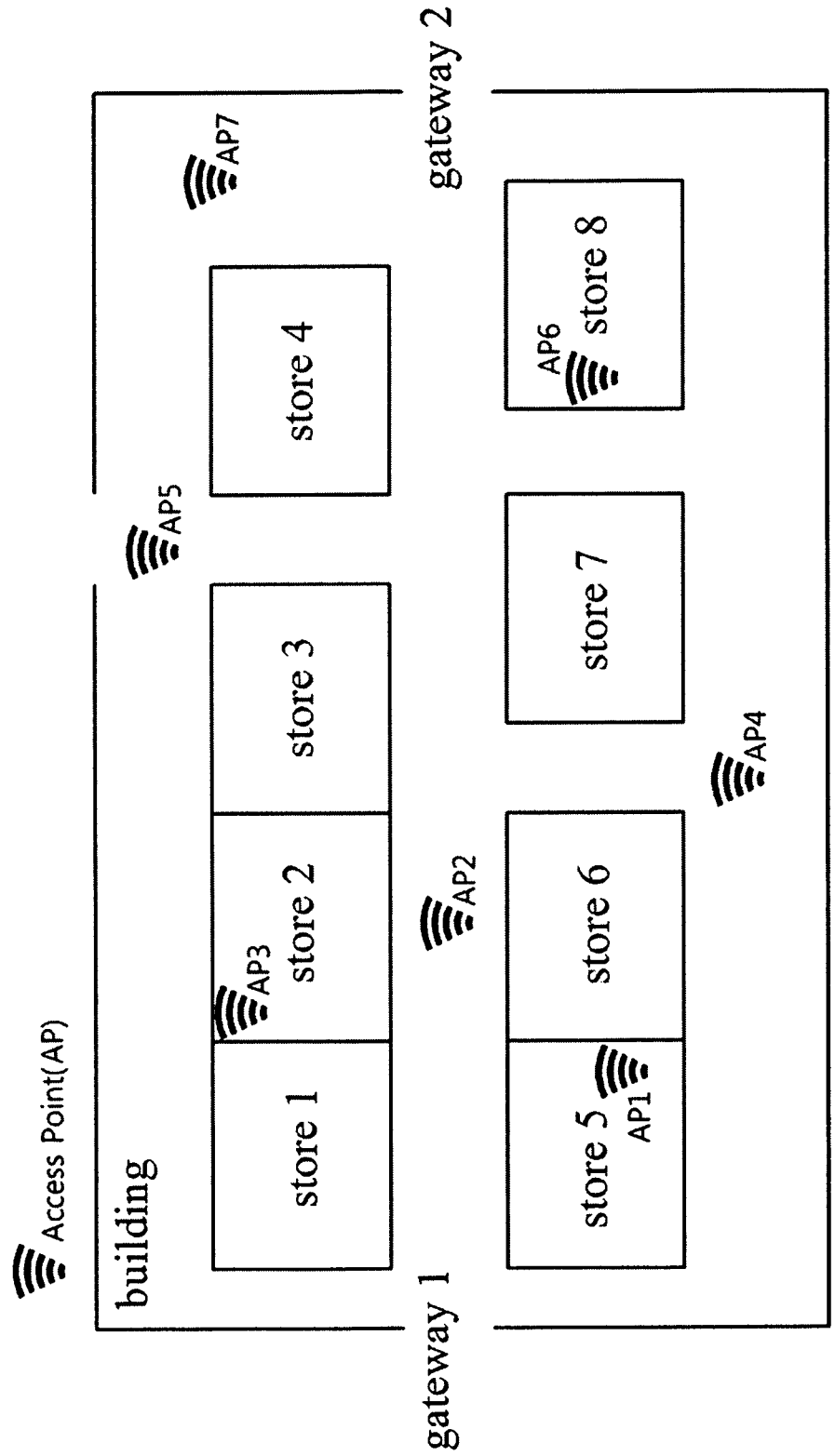
FIG. 6 is a drawing illustrating a state where wireless access points (APs) are disposed in a target building according to at least one example embodiment of the inventive concepts.
Figure 7:
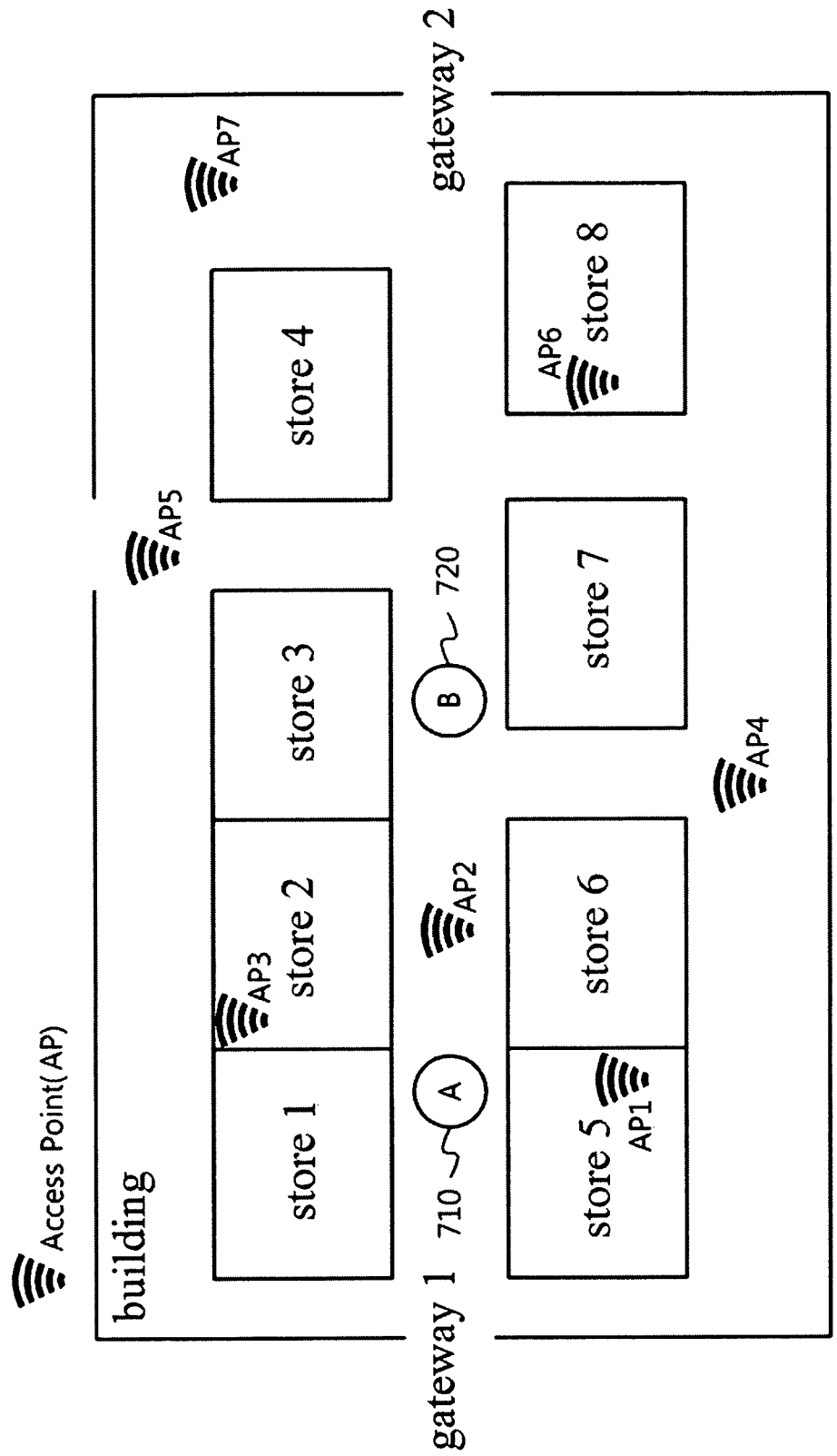
FIG. 7 is a drawing illustrating signal strength according to difference between distances from a wireless AP information collecting device to wireless APs according to at least one example embodiment of the inventive concepts.

FIG. 6 is a drawing illustrating a state where wireless APs are disposed in a target building according to at least one example embodiment of the inventive concepts. FIG. 7 is a drawing illustrating signal strength according to difference between distances from a wireless AP information collecting device to wireless APs according to at least one example embodiment of the inventive concepts.

As show in FIG. 6, a plurality of wireless APs may be disposed in a building. When a user enters a target building in which the wireless APs shown in FIG. 6 are disposed, signal strength of each of the wireless APs AP1 to AP7, which is received in a user terminal, may be differently measured according to a location of the user.

For example, as shown in FIG. 7, when the user moves from a point A 710 to a point B 720, while the wireless APs AP1 to AP3 are relatively closer to a user terminal than the wireless APs AP4 to AP7 at the point A 710. Further, the wireless APs AP4 to AP7 are relatively closer to the user terminal at the point B 720 than at point A 710.

Signal strength at the point A 710 and the point B 720 from each of the wireless APs may be indicated in Table 1 below. According to at least some example embodiments, units of the values in Tables 1-3 may be, for example, decibel milliwatts (dBm).

TABLE 1

|     | Signal strength at point A | Signal strength at point B |
| --- | --- | --- |
| AP1 | −40 | −60 |
| AP2 | −35 | −40 |
| AP3 | −45 | −55 |
| AP4 | −70 | −55 |
| AP5 | −75 | −55 |
| AP6 | −90 | −60 |
| AP7 |     | −65 |

As such, according to at least one example embodiment of the inventive concepts, a service system 100 of FIG. 1 may determine an indoor location of the user using signal strength from each of peripheral APs, which differs according to a location of the user.

Figure 8:
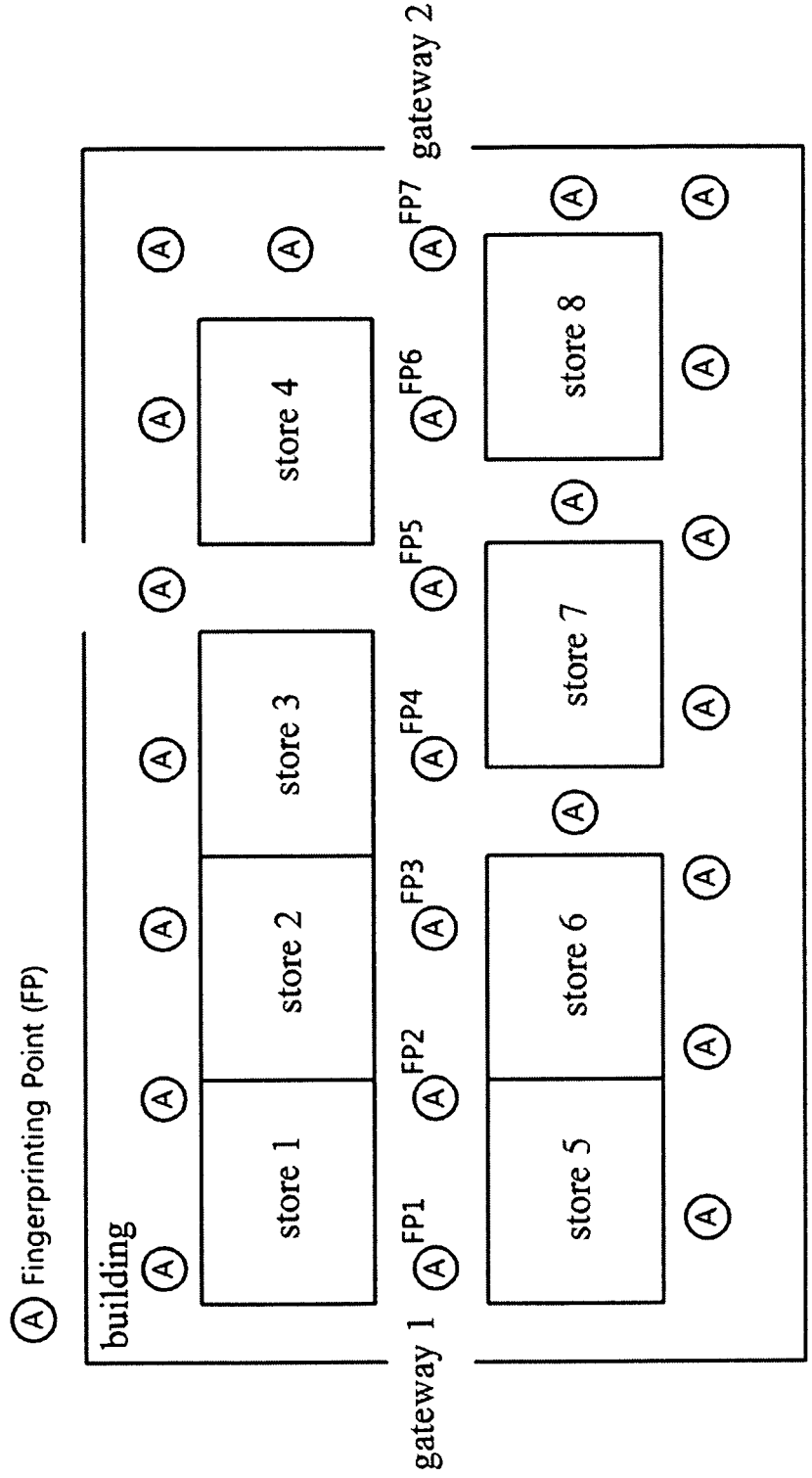
FIG. 8 is a drawing illustrating a process of determining an indoor location of a user according to at least one example embodiment of the inventive concepts.
Figure 9:
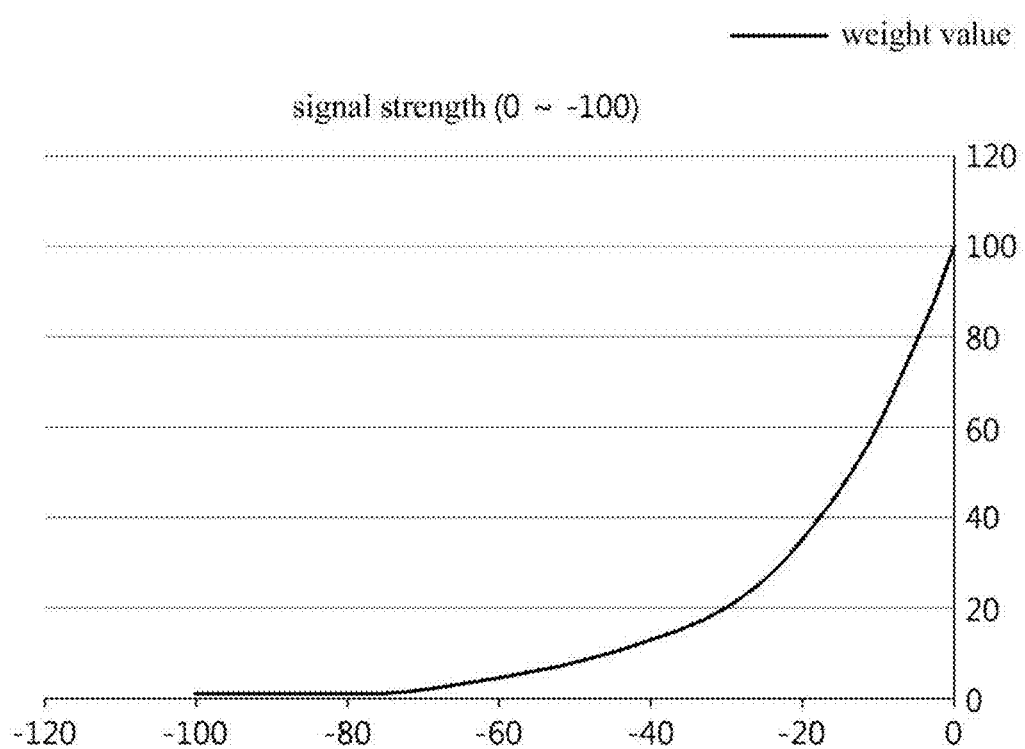
FIG. 9 is a graph diagram illustrating a weight value applied according to signal strength of a wireless AP according to at least one example embodiment of the inventive concepts.

FIG. 8 is a drawing illustrating a process of determining an indoor location of a user according to at least one example embodiment of the inventive concepts. FIG. 9 is a graph diagram illustrating a weight value applied according to signal strength of a wireless AP according to at least one example embodiment of the inventive concepts.

As shown in FIG. 8, a service system 100 of FIG. 1 may perform fingerprinting at equal intervals. For example, when collecting information about wireless APs while a user moves from a gateway 1 to a gateway 2 in a building, the service system 100 may determine collected locations in the order of a fingerprinting point 1 (FP1) location to an FP7 location.

Table 2 indicates absolute coordinates of the FP1 location to the FP3 location in FIG. 8 and signal strength at each of the FP1 location to the FP3 location from each of wireless APs.

TABLE 2

|           | FP1        | FP2        | FP3        |
| ---       | ---        | ---        | ---        |
| Latitude  | 37.385350  | 37.385337  | 37.385365  |
| Longitude | 127.121150 | 127.121378 | 127.121585 |
| AP1       | −40        | −50        | −60        |
| AP2       | −35        | −37        | −40        |
| AP3       | −45        | −50        | −55        |
| AP4       | −70        | −63        | −55        |
| AP5       | −75        | −65        | −55        |
| AP6       | −90        | −75        | −60        |

As such, the service system 100 may accurately and quickly determine a location of a user using actual location information (latitude/longitude) of a point to collect information about wireless APs and information about wireless APs for each point.

Hereinafter, a description is given of a process of determining a location of a user in the building shown in FIG. 8 according to information in Table 2 above.

Table 3 indicates signal strength of each of wireless APs, which is collected while a user terminal which is present in a specific location moves from a specific time T to a specific time T+2 in an environment shown in FIG. 8.

TABLE 3

|     | Time T | Time T + 1 | Time T + 2 |
| --- | ---    | ---        | ---        |
| AP1 | −45    | −55        | −50        |
| AP2 | −40    | −45        | −50        |
| AP3 | −50    | −60        | −55        |
| AP4 | −60    | −60        | −45        |
| AP5 | −65    | −60        | −65        |
| AP6 | −80    | −75        | −70        |

When signal strength of a wireless AP, which is collected through fingerprinting, is referred to as F.AP and when signal strength of a wireless AP, which is collected by a user terminal, is referred to as C.AP, similarity between a location of the user terminal and the FP1 location in the time T may be calculated using Equation 1 below.

$$\mathrm{Sim}(x) = (100 - |(F.AP1 - C.AP1)|) * f(C.AP1) + (100 - |(F.AP2 - C.AP2)|) * f(C.AP2) \ldots (100 - |(F.AP6 - C.AP6)|) * f(C.AP6) \quad \text{[Equation 1]}$$

Herein, function f(x) may be a weight function and may have an exponential curve. For example, function f(x) may be a weight function having the exponential curve shown in FIG. 9. Accordingly, 'x' in Sim(x) may represent an index of a fingerprint (e.g., FPx), while 'x' in f(x) may represent an index of an access point (e.g., APx).

Similarity between signal strength of each of wireless APs for each point in Table 2, which is collected through fingerprinting, and signal strength of each of wireless APs of the time T to the time T+2 in table 3, which is received from a user terminal, may be calculated using Equations 2 to 4 below.

Similarity between the location of the user terminal and the FP1 location in a location of the time T may be calculated using Equation 2 below.

$$\mathrm{Sim}(FP1) = (100 - |(-40) - (-45)|) * (11) + (100 - |(-35) - (-40)|) * (13) + (100 - |(-45) - (-50)|) * (8) + (100 - |(-70) - (-60)|) * (5) + (100 - |(-75) - (-65)|) * (3) + (100 - |(-90) - (-80)|) * (1) = 3850 \quad \text{[Equation 2]}$$

Similarity between the location of the user terminal and the FP2 location in a location of the time T may be calculated using Equation 3 below.

$$\mathrm{Sim}(FP2) = (100 - |(-50) - (-45)|) * (11) + (100 - |(-37) - (-40)|) * (13) + (100 - |(-50) - (-50)|) * (8) + (100 - |(-63) - (-60)|) * (5) + (100 - |(-65) - (-65)|) * (3) + (100 - |(-75) - (-80)|) * (1) = 3986 \quad \text{[Equation 3]}$$

Similarity between the location of the user terminal and the FP3 location in a location of the time T may be calculated using Equation 4 below.

$$\mathrm{Sim}(FP3) = (100 - |(-60) - (-45)|) * (11) + (100 - |(-40) - (-40)|) * (13) + (100 - |(-55) - (-50)|) * (8) + (100 - |(-55) - (-60)|) * (5) + (100 - |(-55) - (-65)|) * (3) + (100 - |(-60) - (-80)|) * (1) = 3820 \quad \text{[Equation 4]}$$

According to at least some example embodiments of the inventive concepts, the location of the user terminal may be determined as the location with the highest similarity, which is the FP2 location in the example above. Accordingly, the FP2 location of latitude 37.385337 and longitude 127.121378 may be determined as the location of the user terminal.

Analyzing Equation 1, similarity between the location of the user terminal and the FP location may be calculated using Equation 5 below.

$$\text{Sim}(x) = \Sigma(A-B) * C \quad \text{[Equation 5]}$$

The value A in equation 5 is 100 and denotes a constant. The constant is a constant value which has a greater value as difference in signal strength 0 to 100 becomes less and less. The value B in equation 5 is |(F.APx−C.APx)| and denotes signal strength difference. The signal strength difference is a difference value between collected signal strength and current signal strength. The value C in equation 5 is f(x) and denotes a weight value for each signal strength. The weight value for each signal strength is a weight function for each signal strength which is experimentally obtained.

Similarity between the location of the user terminal and the FP location may be calculated in the order of the times T, T+1, and T+2 using Equations 6 to 14.

Similarity between the location of the user terminal and the FP location in the time T may be calculated using Equations 6 to 8.

$$\text{Sim(FP1)} = (100-|(-40)-(-45)|)*(11)+(100-|(-35)-(-40)|)*(13)+(100-|(-45)-(-50)|)*(8)+(100-|(-70)-(-60)|)*(5)+(100-|(-75)-(-65)|)*(3)+(100-|(-90)-(-80)|)*(1) = 3850 \quad \text{[Equation 6]}$$

$$\text{Sim(FP2)} = (100-|(-50)-(-45)|)*(11)+(100-|(-37)-(-40)|)*(13)+(100-|(-50)-(-50)|)*(8)+(100-|(-63)-(-60)|)*(5)+(100-|(-65)-(-65)|)*(3)+(100-|(-75)-(-80)|)*(1) = 3986 \quad \text{[Equation 7]}$$

$$\text{Sim(FP3)} = (100-|(-60)-(-45)|)*(11)+(100-|(-40)-(-40)|)*(13)+(100-|(-55)-(-50)|)*(8)+(100-|(-55)-(-60)|)*(5)+(100-|(-55)-(-65)|)*(3)+(100-|(-60)-(-80)|)*(1) = 3820 \quad \text{[Equation 8]}$$

Similarity between the location of the user terminal and the FP location in the time T+1 may be calculated using Equation 9 to 11.

$$\text{Sim(FP1)} = (100-|(-40)-(-55)|)*(6)+(100-|(-35)-(-45)|)*(11)+(100-|(-45)-(-60)|)*(5)+(100-|(-70)-(-60)|)*(5)+(100-|(-75)-(-60)|)*(5)+(100-|(-90)-(-75)|)*(1) = 2885 \quad \text{[Equation 9]}$$

$$\text{Sim(FP2)} = (100-|(-50)-(-55)|)*(6)+(100-|(-37)-(-45)|)*(11)+(100-|(-50)-(-60)|)*(5)+(100-|(-63)-(-60)|)*(5)+(100-|(-65)-(-60)|)*(5)+(100-|(-75)-(-75)|)*(1) = 3092 \quad \text{[Equation 10]}$$

$$\text{Sim(FP3)} = (100-|(-60)-(-55)|)*(6)+(100-|(-40)-(-45)|)*(11)+(100-|(-55)-(-60)|)*(5)+(100-|(-55)-(-60)|)*(5)+(100-|(-55)-(-60)|)*(5)+(100-|(-60)-(-75)|)*(1) = 3125 \quad \text{[Equation 11]}$$

Similarity between the location of the user terminal and the FP location in the time T+2 may be calculated using Equations 12 to 14.

$$\text{Sim(FP1)} = (100-|(-40)-(-50)|)*(8)+(100-|(-35)-(-50)|)*(8)+(100-|(-45)-(-55)|)*(6)+(100-|(-45)-(-60)|)*(5)+(100-|(-75)-(-65)|)*(3)+(100-|(-90)-(-70)|)*(2) = 2795 \quad \text{[Equation 12]}$$

$$\text{Sim(FP2)} = (100-|(-50)-(-50)|)*(8)+(100-|(-37)-(-50)|)*(8)+(100-|(-50)-(-55)|)*(6)+(100-|(-63)-(-60)|)*(5)+(100-|(-65)-(-65)|)*(3)+(100-|(-75)-(-70)|)*(2) = 3041 \quad \text{[Equation 13]}$$

$$\text{Sim(FP3)} = (100-|(-60)-(-50)|)*(8)+(100-|(-40)-(-50)|)*(8)+(100-|(-55)-(-55)|)*(6)+(100-|(-55)-(-60)|)*(5)+(100-|(-55)-(-65)|)*(3)+(100-|(-60)-(-70)|)*(2) = 2965 \quad \text{[Equation 14]}$$

Based on the examples illustrated above by equations 6-14, the service system 100 may use equation 5 to determine that the user moved from the FP2 location at time T to the FP3 location and time T+1, and moved back to the FP2 location again at time T+2.

As such, to determine an indoor location of the user, information about each of peripheral wireless APs, which is collected for each point in a target building, may be stored in a database. The information about each of the peripheral wireless APs, which may be collected for each point in the target building, may be collected by a wireless AP information collecting device, an indoor map constructing device, and the like.

Figure 10:
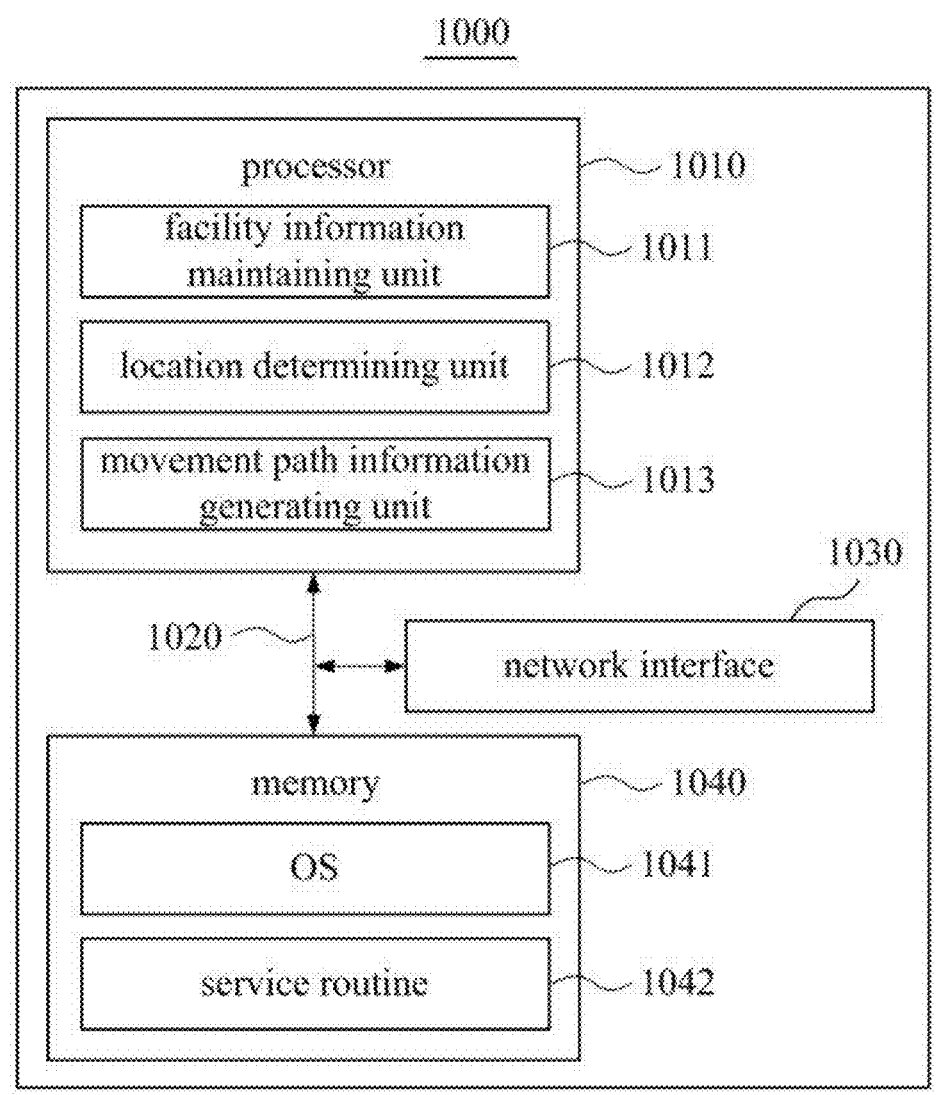
FIG. 10 is a block diagram illustrating a configuration of a service system according to at least one example embodiment of the inventive concepts.
Figure 11:
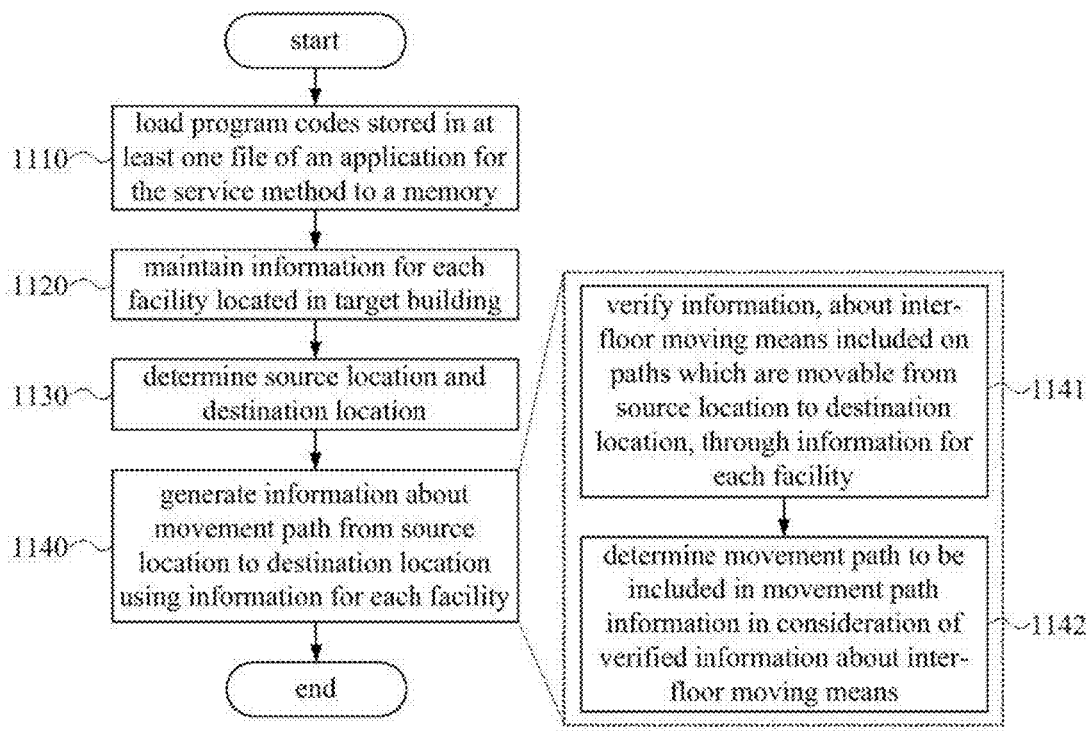
FIG. 11 is a flowchart illustrating an operation of a service method according to at least one example embodiment of the inventive concepts.

FIG. 10 is a block diagram illustrating a configuration of a service system according to at least one example embodiment of the inventive concepts. FIG. 11 is a flowchart illustrating an operation of a service method according to at least one example embodiment of the inventive concepts.

Figure 12:
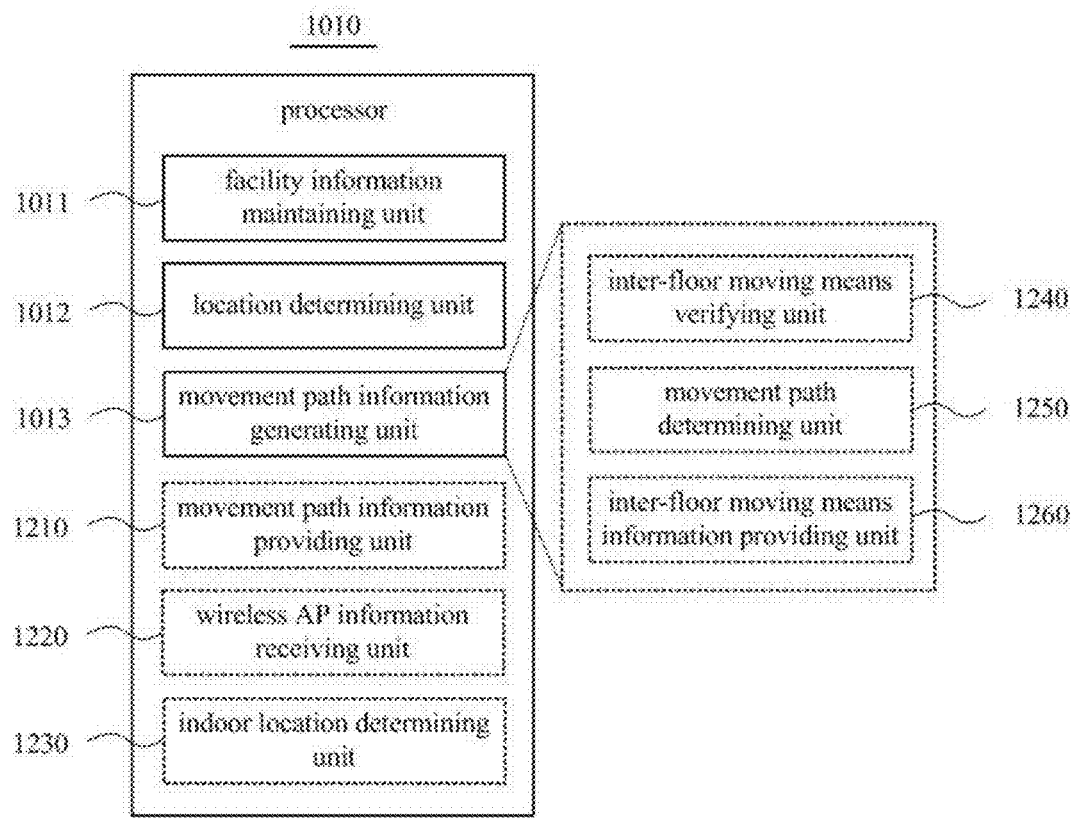
FIG. 12 is a block diagram illustrating another configuration of a processor according to at least another example embodiment of the inventive concepts.

A service system 1000 according to at least one example embodiment of the inventive concepts may correspond to the service system 100 described above. As shown in FIG. 10, the service system 1000 may include a processor 1010, a bus 1020, a network interface 1030, and a memory 1040. The memory 1040 may include an operating system (OS) 1041 and a service routine 1042. The processor 1010 may include a facility information maintaining unit 1011, a location determining unit 1012, and a movement path information generating unit 1013. In this case, the movement path information generating unit 1013 may include an inter-floor moving means or device verifying unit 1240 and a movement path determining unit 1250 which are shown in FIG. 12. In at least other example embodiments of the inventive concepts, the service system 1000 may include more elements than that of FIG. 10. However, there is no need for clearly illustrating most conventional elements. For example, the service system 1000 may further include another element such as a display or a transceiver.

The memory 1040 may be a computer-readable medium and may include permanent mass storage devices such as a random access memory (RAM), a read only memory (ROM), and a disc drive. Also, the memory 1040 may store program codes for the OS 1041 and the service routine 1042. These software elements may be loaded from a computer-readable medium which is independent of the memory 1040 using a drive mechanism (not shown). This computer-readable medium may include a computer-readable medium (not shown) such as a floppy drive, a disc, a tape, a Digital Versatile Disc (DVD)/compact disc (CD)-ROM drive, and a memory card. In at least another example embodiment of the inventive concepts, software elements may be loaded into the memory 1040 through the network interface 1030 other than the computer-readable medium. For example, the service routine 1042 may be loaded into the memory 1040 according to programs installed by files provided from developers through a network.

The bus 1020 may facilitate communication and data transmission between elements of the service system 1000. The bus 1020 may be configured using a high-speed serial bus, a parallel bus, a storage area network (SAN), and/or other proper communication technologies.

The network interface 1030 may be a computer hardware element for connecting the service system 1000 to a computer network. The network interface 1030 may connect the service system 1000 to a computer network through a wireless or wired connection.

The processor 1010 may be configured to process instructions of a computer program by performing a basic arithmetic operation, a basic logic operation, and an input-output operation of the service system 1000. The instructions may be provided to the processor 1010 through the bus 1020 by the memory 1040 or the network interface 1030. The facility information maintaining unit 1011, the location determining unit 1012, and the movement path information generating unit 1013 included in the processor 1010 may be configured to execute program codes or instructions. These program codes or instructions may be stored in a recording device (e.g., the service routine 1042) such as the memory 1040.

According to at least some example embodiments of the inventive concepts, the processor 1010 configured as the facility information maintaining unit 1011, the location determining unit 1012, and the movement path information generating unit 1013 may be configured to perform steps 1110, 1120, 1130, and 1140 of FIG. 11.

In step 1110, the processor 1010 may load program codes stored in at least one file of an application for the service method to a memory (e.g., the memory 1040). For example, the at least one file of the application may be provided from file distribution server through a network and be installed the service system 1000. When the application is executed, the processor 1010 may load the program codes (or instructions) from the at least one file to memory.

Each of the facility information maintaining unit 1011, the location determining unit 1012, and the movement path information generating unit 1013 may be configured to execute a corresponding part of the program codes (or instructions) in the memory to process steps 1120, 1130, and 1140.

In step 1120, the facility information maintaining unit 1011 may maintain information for each facility located in a target building. As described above, the target building may refer to any building selected among a plurality of buildings or a plurality of buildings connected with each other. Also, the information for each facility may include information about companies (e.g., stores which are located in a department store or an outlet, and the like) or amenities (e.g., toilets, elevators, escalators, stairs, and the like), and the like which are located in the target building.

In step 1130, the location determining unit 1012 may determine a source location and a destination location. For example, the source location and the destination location may be selected through a user terminal. The location determining unit 1012 may transmit map information in the target building to the user terminal and may determine locations selected according to the map information by the user terminal as a source location and a destination location. The source location may be selectively determined as an indoor location of the user terminal.

In step 1140, the movement path information generating unit 1013 may generate information about a movement path from the source location to the destination location using the information for each facility. This movement path information may be used in a road guide service and the like.

FIG. 12 is a block diagram illustrating another configuration of a processor according to at least another example embodiment of the inventive concepts. A movement path information generating unit 1013 included in a processor 1010 may include an inter-floor moving means or device verifying unit 1240 and a movement path determining unit 1250. The inter-floor moving means or device verifying unit 1240 and the movement path determining unit 1250 may be configured to execute a part of the program codes (or instructions) in the memory to perform steps 1141 and 1142 of FIG. 11.

In step 1141, the inter-floor moving means or device verifying unit 1240 may verify information about each of inter-floor moving means or device, which are included on paths which are movable from a source location to a destination location (i.e., paths that a user can travel along and that extend from the source location to the destination location), through information for each facility. The inter-floor moving means or device may mean means, such as escalators, elevators, and stairs, which are used to move to other floors.

In step 1142, the movement path determining unit 1250 may determine a movement path to be included in movement path information in consideration of the verified information about the inter-floor moving means or device. In other words, a service system 1000 of FIG. 10 may provide a road guide service indoors through movement path information. When inter-floor movement occurs, the service system 1000 may generate movement path information used for the road guide service in consideration of inter-floor moving means or device.

For example, the movement path determining unit 1250 may determine a movement path such that an inter-floor moving means or device selected by a user terminal among the verified inter-floor moving means or devices is included in the movement path information. For one example, when a user selects an escalator, the movement path determining unit 1250 may determine a movement path to be via the selected escalator. When the user selects an elevator, the movement path determining unit 1250 may determine a movement path to be via the selected elevator.

For another example, the movement path determining unit 1250 may calculate a movement time according to each of movement paths via the verified inter-floor moving means or device and may determine a movement path according to the calculated movement time. For example, a movement path with the shortest movement time may be recommended to the user. When a plurality of movement paths are recommended to the user, movement path information including a plurality of movement paths with the shortest movement time may be generated.

According to at least another example embodiment of the inventive concepts, the movement path information generating unit 1013 may further include an inter-floor moving means or device information providing unit 1260 if necessary. For example, step 1140 in a service method according to at least one example embodiment of the inventive concepts may further include a step (not shown) of providing information about verified inter-floor moving means or devices to the user terminal. In this case, the step (not shown) may be performed by the inter-floor moving means or device information providing unit 1260.

According to at least another example embodiment of the inventive concepts, the processor 1010 may further include at least one of a movement path information providing unit 1210, a wireless AP information receiving unit 1220, or an indoor location determining unit 1230.

For example, the service method according to at least one example embodiment of the inventive concepts may further include a step (not shown) of providing the movement path information to the user after step 1140 is performed. For example, the step (not shown) may be performed by the movement path information providing unit 1210. In this case, the movement path information providing unit 1210 may configure a card view including movement path information for each floor and may provide a card view of a floor where the user terminal is located to the user terminal according to the location of the user terminal. For example, when the floor where the user terminal is located is changed, the service system 1000 may provide a new card view of a floor, to which the user terminal moves, to the user terminal irrespective of a request from the user terminal. An old card view may be changed to a new card view as the floor where the user terminal is located is changed to be displayed on a screen.

Also, the service method according to at least one example embodiment of the inventive concepts may further include a step (not shown) of receiving information about wireless APs around the user terminal from the user terminal which is located in a target building and a step (not shown) of determining an indoor location of the user terminal according to similarity between information about each of peripheral wireless APs, which is collected for each point of the target building, and information about each of wireless APs around the user terminal. These steps (not shown) may be performed by the wireless AP information receiving unit 1220 and the indoor location determining unit 1230. For example, the information about each of the peripheral wireless APs, which is collected for each point, may be collected at equal intervals in the target building and may include a media access control (MAC) address and signal strength of each of wireless APs which are located around each point. For example, the indoor location determining unit 1230 may calculate similarity between signal strength of each of peripheral wireless APs, which is collected for each point, and signal strength of each of wireless APs around the user terminal according to a MAC address of each of the peripheral wireless APs, which is collected for each point, and a MAC address of each of the wireless APs around the user terminal and may determine a point with the highest similarity as an indoor location of the user terminal.

According to at least one example embodiment of the inventive concepts, any or all of the units (e.g., units 1011~1260 illustrated in FIGS. 10 and 12) discussed herein as being included in the processor 1010 may be implemented as program code executed by the processor 1010. The program code may be stored in a memory (e.g., memory 1040) and may include computer executable instructions corresponding to each of the operations described herein as being performed by any or all of units discussed as being included in the processor 1010.

As such, according to at least some example embodiments of the inventive concepts, the service system may provide indoor location information including information about inter-floor moving means or device such as stairs, elevators, or escalators. Also, the service system may provide an improved or, alternatively, optimum movement path indoors by determining a more proper inter-floor moving means or device in consideration of a movement time.

The foregoing devices may be realized by hardware elements, software elements and/or combinations thereof. For example, the devices and components illustrated in the example embodiments of the inventive concepts may be implemented in one or more general-use computers that are programmed to become special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Alternatively, the processing unit may have a different processing configuration, such as a parallel processor.

The term 'processor', as used herein, may refer to, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multi-core processor; a multiprocessor, an application-specific integrated circuit (ASIC), and a field programmable gate array (FPGA).

Software may include computer programs, codes, instructions or one or more combinations thereof and configure a processing unit to operate in a desired manner or independently or collectively control the processing unit. Software and/or data may be permanently or temporarily embodied in any type of machine, components, physical equipment, virtual equipment, computer storage media or units or transmitted signal waves to be interpreted by the processing unit or to provide instructions or data to the processing unit. Software may be dispersed throughout computer systems connected via networks and be stored or executed in a dispersion manner. Software and data may be recorded in one or more computer-readable storage media.

The methods according to the above-described example embodiments of the inventive concepts may be implemented with program instructions which may be executed by various computer means and may be recorded in computer-readable media. The computer-readable media may also include, alone or in combination with the program instructions, data files, data structures, and the like. The program instructions recorded in the media may be designed and configured specially for the example embodiments of the inventive concepts or be known and available to those skilled in computer software. Computer-readable media may include magnetic media such as hard disks, floppy disks, and magnetic tape; optical media such as CD ROM disks and DVDs; magneto-optical media such as floptical disks; and hardware devices which are specially configured to store and perform program instructions, such as a read-only memory (ROM), a random access memory (RAM), a flash memory, and the like. Program instructions may include both machine codes, such as produced by a compiler, and higher-level language codes which may be executed by the computer using an interpreter. The described hardware devices may be configured to act as one or more software modules to perform the operations of the above-described example embodiments of the inventive concepts, or vice versa.

While at least some example embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A service method in a service system implemented with a computer, the method comprising:
generating, by one or more processors, movement path information from a source location to a destination location in a target building including a plurality of floors and one or more first inter-floor movement devices;
configuring a card view including the movement path information according to each floor from among the plurality of floors; and
providing a card view of an occupied floor to a user terminal based on a location of the user terminal such that the card view is displayed on the user terminal, the occupied floor being a floor, from among the plurality of floors, where a user terminal is located,
wherein the providing includes providing a new card view of a new floor to the user terminal such that the new card view is displayed on the user terminal when the occupied floor changes to the new floor, irrespective of a request from the user terminal,
wherein the movement path information is generated based on information about one or more inter-floor moving devices, from among the one or more first inter-floor movement devices, included on paths which extend from the source location to the destination location, and
wherein the card view includes information about one or more inter-floor moving devices, from among the one or more first inter-floor movement devices, of the occupied floor.

2. The method of claim 1, wherein the generating the movement path information comprises:
providing information about the one or more first inter-floor moving devices to the user terminal; and
generating the movement path information to include an inter-floor moving device selected by the user terminal among the one or more first inter-floor moving devices.

3. The method of claim 1, wherein the generating the movement path information comprises:
determining a movement time for each movement path via each of the one or more first inter-floor moving devices; and
generating the movement path information based on the determined movement time.

4. The method of claim 1, further comprising:
receiving information about peripheral wireless access points (APs) around the user terminal from the user terminal; and
determining an indoor location of the user terminal based on a similarity between fingerprint information and information about each of the peripheral wireless APs around the user terminal, the fingerprint information including information about each of a plurality of peripheral wireless APs that is collected for each of a plurality of points of the target building.

5. The method of claim 4, wherein the movement path information is generated based on the indoor location of the user terminal.

6. The method of claim 4, further comprising:
providing the movement path information to the user terminal;
correcting the movement path information based on the indoor location of the user terminal; and
providing the corrected movement path information to the user terminal.

7. The method of claim 4, further comprising:
collecting the fingerprint information at equal intervals in the target building,
wherein the fingerprint information includes, for each of the plurality of points in the target building, a media access control (MAC) address and signal strength of each of the plurality of peripheral wireless APs that are located around the point, and
wherein the determining of the indoor location of the user terminal includes,
determining a similarity between signal strengths of each of the plurality of peripheral wireless APs corresponding to each of the plurality of points in the target building and signal strengths of each of the wireless APs around the user terminal based on MAC addresses of the plurality of peripheral wireless APs and a MAC addresses of the wireless APs around the user terminal, and
determining a point, from among the plurality of points in the target building, that corresponds to the highest similarity as the indoor location of the user terminal.

8. The method of claim 1, wherein each of the one or more first inter-floor moving devices includes at least one of an elevator, an escalator, or stairs.

9. A non-transitory computer-readable medium storing instructions that, when executed by a computer, cause the computer to perform operations including,
generating movement path information from a source location to a destination location in a target building including a plurality of floors and one or more first inter-floor moving devices;
configuring a card view including the movement path information according to each floor from among the plurality of floors; and
providing a card view of an occupied floor to a user terminal based on a location of the user terminal, the occupied floor being a floor, from among the plurality of floors, where a user terminal is located,
wherein the providing includes providing a new card view of a new floor to the user terminal such that the new card view is displayed on the user terminal when the occupied floor changes to the new floor, irrespective of a request from the user terminal,
wherein the movement path information is generated based on information about one or more inter-floor moving devices, from among the one or more first inter-floor moving devices, included on paths which extend from the source location to the destination location, and
wherein the card view includes information about one or more inter-floor moving devices, from among the one or more first inter-floor moving devices, of the occupied floor.

10. A service system implemented with a computer, the system comprising:
a memory storing computer-executable instructions; and
at least one processor configured to execute computer-executable instructions such that the at least one processor is configured to,
generate movement path information from a source location to a destination location in a target building including a plurality of floors and one or more first inter-floor moving devices such that the movement path information is generated based on information about one or more inter-floor moving devices, from among the one or more first inter-floor moving devices, included on paths that extend from the source location to the destination location, configure a card view including the movement path information according to each floor from among the plurality of floors such that the card view includes information about one or more inter-floor moving devices, from among the one or more first inter-floor moving devices, of an occupied floor, the occupied floor being a floor, from among the plurality of floors, where a user terminal is located, and provide a card view of the occupied floor to the user terminal based on a location of the user terminal, wherein the providing includes providing a new card view of a new floor to the user terminal such that the new card view is displayed on the user terminal when the occupied floor changes to the new floor, irrespective of a request from the user terminal.

11. The system of claim 10, wherein the at least one processor is further configured to execute computer-executable instructions such that the at least one processor is configured to provide information about the one or more first inter-floor moving devices to the user terminal and generate the movement path information to include an inter-floor moving device selected by the user terminal among the one or more first inter-floor moving devices.

12. The system of claim 10, wherein the at least one processor is further configured to execute computer-executable instructions such that the at least one processor is configured to determine a movement time for each movement path via each of the one or more first inter-floor moving devices and generate the movement path information based on the determined movement time.

13. The system of claim 10, the at least one processor is further configured to execute computer-executable instructions such that the at least one processor is configured to receive information about peripheral wireless access points (APs) around the user terminal from the user terminal; and determine an indoor location of the user terminal based on a similarity between fingerprint information and information about each of the peripheral wireless APs around the user terminal, the fingerprint information including information about each of a plurality of peripheral wireless APs that is collected for each of a plurality of points of the target building.

* * * * *